(12) United States Patent
Oya

(10) Patent No.: US 10,315,688 B2
(45) Date of Patent: Jun. 11, 2019

(54) VEHICLE STEERING DEVICE

(71) Applicant: JTEKT CORPORATION, Osaka-shi, Osaka (JP)

(72) Inventor: Toshiaki Oya, Sakai (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/717,360

(22) Filed: Sep. 27, 2017

(65) Prior Publication Data

US 2018/0099690 A1    Apr. 12, 2018

(30) Foreign Application Priority Data

Oct. 6, 2016 (JP) .................................. 2016-198167

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2019.01) |

(Continued)

(52) U.S. Cl.
CPC ........... B62D 5/0418 (2013.01); B62D 5/001 (2013.01); B62D 5/0463 (2013.01); B62D 5/0466 (2013.01); B62D 6/002 (2013.01)

(58) Field of Classification Search
CPC .... B62D 5/0418; B62D 5/001; B62D 5/0463; B62D 5/0466; B62D 6/002; B62D 5/04; B62D 5/0457

USPC ............................................ 701/41; 180/444
See application file for complete search history.

(56) References Cited

U.S. PATENT DOCUMENTS

| | | | |
|---|---|---|---|
| 6,622,813 B2 | 9/2003 | Matz et al. | |
| 2005/0072621 A1* | 4/2005 | Hara ...................... | B62D 1/163 180/444 |
| 2014/0129089 A1* | 5/2014 | Takeuchi ............. | B62D 5/0466 701/41 |

FOREIGN PATENT DOCUMENTS

| | | |
|---|---|---|
| EP | 1 219 525 A2 | 7/2002 |
| JP | 2008-174160 A | 7/2008 |
| JP | 2015-020586 A | 2/2015 |

OTHER PUBLICATIONS

Mar. 7, 2018 Extended Search Report issued in European Patent Application No. 17194419.2.

* cited by examiner

*Primary Examiner* — Mahmoud S Ismail
(74) *Attorney, Agent, or Firm* — Oliff PLC

(57) ABSTRACT

A left steering ECU includes switching control unit that switches control mode between a first control mode and a second control mode. The first control mode is mode in which the left steering ECU controls left steering motor so that the steered angle of a left steered wheel becomes equal to a left target steered angle received from a higher-level control device. The second control mode is a mode in which the left steering ECU controls the left steering motor by torque feedback control so that the steered angle of the left steered wheel becomes equal to an angle corresponding to a neutral position of the left steered wheel. The switching control unit normally sets the control mode to the first control mode. The switching control unit switches the con- (Continued)

trol mode to the second control mode if abnormal communication occurs between the higher-level control device and the left steering ECU.

4 Claims, 7 Drawing Sheets

(51) Int. Cl.
*G06F 19/00* (2018.01)
*B62D 5/04* (2006.01)
*B62D 5/00* (2006.01)

VEHICLE STEERING DEVICE

INCORPORATION BY REFERENCE

The disclosure of Japanese Patent Application No. 2016-198167 filed on Oct. 6, 2016 including the specification, drawings and abstract, is incorporated herein by reference in its entirety.

BACKGROUND OF THE INVENTION

1. Field of the Invention

The present invention relates to vehicle steering devices which include a right steering operation mechanism that steers a right steered wheel and a left steering operation mechanism that steers a left steered wheel and in which a steering member that is operated to steer a vehicle is not mechanically coupled to the right and left steering operation mechanisms, the right steering operation mechanism is driven by a right steering motor, and the left steering operation mechanism is driven by a left steering motor.

2. Description of the Related Art

Steer-by-wire systems that do not use an intermediate shaft are starting to be recognized as effective in achieving advanced driver assistance functions including autonomous driving and improving flexibility in engine compartment layout. In order to further improve the flexibility in engine compartment layout, right-left independent steering systems have been developed which do not use a steering gear device including a rack and pinion mechanism etc. and which control right and left steered wheels by separate steering motors, as described in Japanese Patent Application Publication No. 2008-174160 (JP 2008-174160 A) and Japanese Patent Application Publication No. 2015-20586 (JP 2015-20586 A).

In steer-by-wire systems using the right-left independent steering system, steering control can be performed by a control system including a higher-level control device, a right steering control device, and a left steering control device. The higher-level control device calculates target steered angles of the right and left steered wheels. The right steering control device is a lower-level control device that controls the right steering motor, and the left steering control device is a lower-level control device that controls the left steering motor. The right steering control device controls the right steering motor based on the target steered angle of the right steered wheel received from the higher-level control device. The left steering control device controls the left steering motor based on the target steered angle of the left steered wheel received from the higher-level control device.

If abnormal communication occurs in such a control system, the target steered angle may temporarily fail to be sent from the higher-level control device to one of the right and left steering control devices. In this case, the steered angle of the steered wheel that is controlled by the one of the right and left steering control devices, namely the steering control device that fails to receive the target steered angle, is fixed to the most recent target steered angle received by this steering control device. Accordingly, steering performance may not be able to be maintained.

SUMMARY OF THE INVENTION

It is one object of the present invention to provide a vehicle steering device that allows a vehicle to travel while maintaining its steering performance even if abnormal communication occurs between a higher-level control device and one of a left steering control device and a right steering control device.

According to an aspect of the present invention, a vehicle steering device, which includes a right steering operation mechanism that steers a right steered wheel and a left steering operation mechanism that steers a left steered wheel, and in which a steering member that is operated to steer a vehicle is mechanically coupled to neither the right steering operation mechanism nor the left steering operation mechanism, the right steering operation mechanism being driven by a right steering motor, and the left steering operation mechanism being driven by a left steering motor, includes: a higher-level control device that sets a right target steered angle and a left target steered angle, the right target steered angle being a target value for a steered angle of the right steered wheel, and the left target steered angle being a target value for a steered angle of the left steered wheel; a left steering control device that drivingly controls the left steering motor; and a right steering control device that drivingly controls the right steering motor. The left steering control device includes a first mode switching unit that switches a control mode between a first control mode and a second control mode, the first control mode being a mode in which the left steering control device controls the left steering motor so that the steered angle of the left steered wheel becomes equal to the left target steered angle received from the higher-level control device, and the second control mode being a mode in which the left steering control device controls the left steering motor by torque feedback control so that the steered angle of the left steered wheel becomes equal to an angle corresponding to a neutral position of the left steered wheel. The first mode switching unit includes a unit that normally sets the control mode to the first control mode and that switches the control mode to the second control mode when abnormal communication occurs between the higher-level control device and the left steering control device. The right steering control device includes a second mode switching unit that switches a control mode between a third control mode and a fourth control mode, the third control mode being a mode in which the right steering control device controls the right steering motor so that the steered angle of the right steered wheel becomes equal to the right target steered angle received from the higher-level control device, and the fourth control mode being a mode in which the right steering control device controls the right steering motor by torque feedback control so that the steered angle of the right steered wheel becomes equal to an angle corresponding to a neutral position of the right steered wheel. The second mode switching unit includes a unit that normally sets the control mode to the third control mode and that switches the control mode to the fourth control mode when abnormal communication occurs between the higher-level control device and the right steering control device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
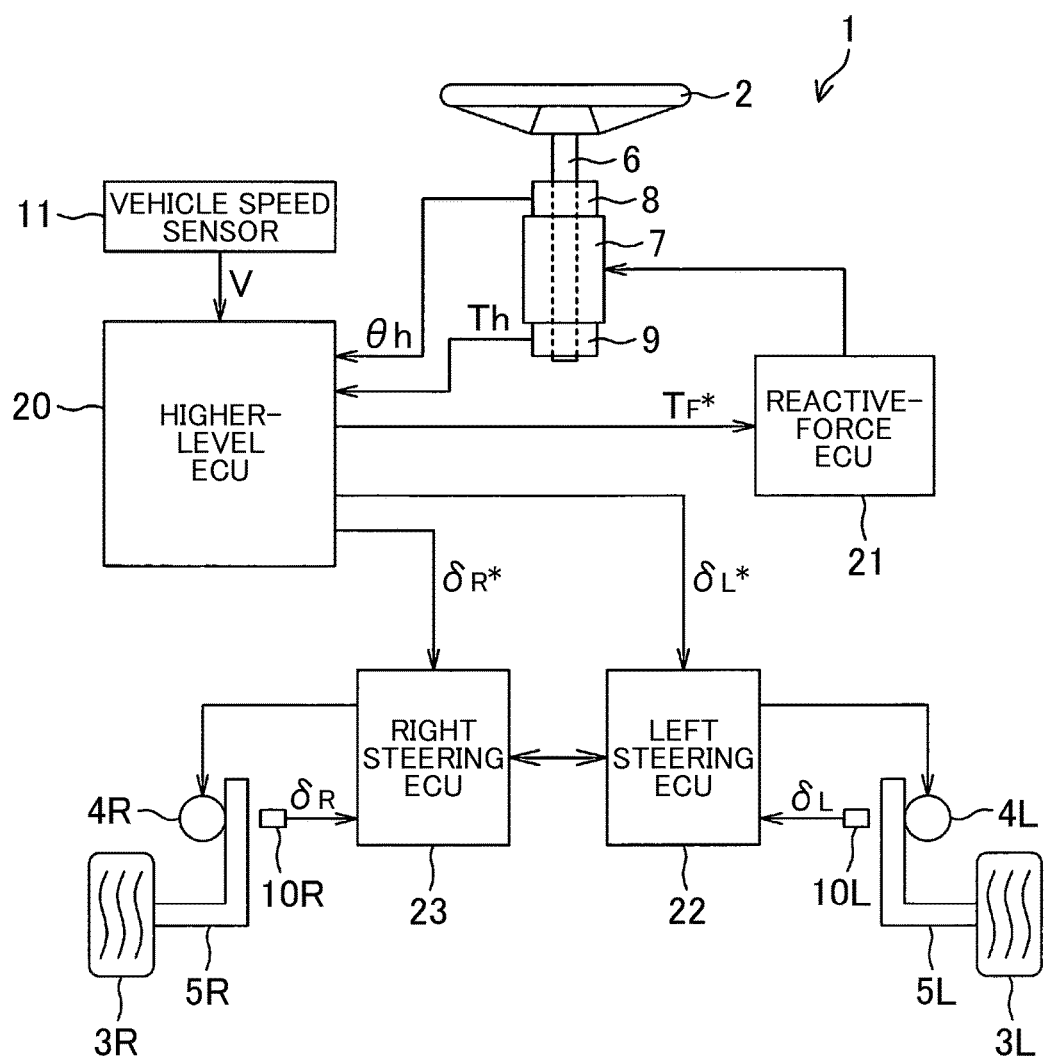
FIG. 1 is an illustration showing the configuration of a vehicle steering device according to an embodiment of the present invention.

An embodiment of the present invention will be described in detail below with reference to the accompanying drawings. FIG. 1 is an illustration showing the configuration of a vehicle steering device according to an embodiment of the present invention. FIG. 1 shows the configuration of a steer-by-wire system using a right-left independent steering system. A vehicle steering device 1 includes a steering wheel 2, a right steered wheel 3R, a left steered wheel 3L, a right steering motor 4R, a left steering motor 4L, a right steering operation mechanism 5R, and a left steering operation mechanism 5L. The steering wheel 2 is a steering member that is operated by a driver to steer a vehicle. The right steering motor 4R and the left steering motor 4L are driven according to rotational operation of the steering wheel 2. The right steering operation mechanism 5R steers the right steered wheel 3R based on the driving force of the right steering motor 4R. The left steering operation mechanism 5L steers the left steered wheel 3L based on the driving force of the left steering motor 4L.

The steering wheel 2 is not mechanically coupled to the right and left steering operation mechanisms 5R, 5L so that no torque or motion such as rotation is mechanically transmitted between the steering wheel 2 and the right and left steering operation mechanisms 5R, 5L. The right steering motor 4R and the left steering motor 4L are drivingly controlled according to the amount by which the steering wheel 2 is operated (steering angle, steering torque, etc.), so that the right steered wheel 3R and the left steered wheel 3L are steered. For example, a suspension device disclosed in JP 2015-20586 A or a steering operation device disclosed in JP 2008-174160 A can be used as the right steering operation mechanism 5R and the left steering operation mechanism 5L.

In the present embodiment, it is assumed that, when the steering motors 4R, 4L are rotated in a forward rotation direction, the steered angles of the steered wheels 3R, 3L change in such a direction that the vehicle is steered to the right (right steering direction), and when the steering motors 4R, 4L are rotated in a reverse rotation direction, the steered angles of the steered wheels 3R, 3L change in such a direction that the vehicle is steered to the left (left steering direction). The steering wheel 2 is coupled to a rotary shaft 6 that is rotatably supported by a vehicle body. The rotary shaft 6 is provided with a reactive-force motor 7. The reactive-force motor 7 generates reactive torque (operational reactive force) to be applied to the steering wheel 2. For example, the reactive-force motor 7 is an electric motor having an output shaft integral with the rotary shaft 6.

A steering angle sensor 8 is mounted around the rotary shaft 6. The steering angle sensor 8 detects the rotation angle of the rotary shaft 6 (steering angle θh of the steering wheel 2). In the present embodiment, the steering angle sensor 8 detects the amount of rotation (rotation angle) of the rotary shaft 6 in each of forward and reverse rotation directions from the neutral position (reference position) of the rotary shaft 6. For example, the output value of the steering angle sensor 8 is positive when the detected rotation of the rotary shaft 6 is rotation to the right from the neutral position, and is negative when the detected rotation of the rotary shaft 6 is rotation to the left from the neutral position.

A torque sensor 9 is also mounted around the rotary shaft 6. The torque sensor 9 detects steering torque Th applied to the steering wheel 2 by the driver. In the present embodiment, the output value of the torque sensor 9 is positive when the detected steering torque Th is torque for steering to the right, and is negative when the detected steering torque Th is torque for steering to the left. The larger the absolute value of the output value of the torque sensor 9 is, the larger the steering torque is.

A right steered angle sensor 10R is mounted near the right steering operation mechanism 5R, and a left steered angle sensor 10L is mounted near the left steering operation mechanism 5L. The right steered angle sensor 10R detects the steered angle $\delta_R$ of the right steered wheel 3R, and the left steered angle sensor 10L detects the steered angle $\delta_L$ of the left steered wheel 3L. The vehicle is further provided with a vehicle speed sensor 11 that detects the vehicle speed V. The steering angle sensor 8, the torque sensor 9, and the vehicle speed sensor 11 are connected to a higher-level electronic control unit (ECU) (higher-level control device) 20. The reactive-force motor 7 is connected to a reactive-force ECU (reactive-force control device) that is one of lower-level ECUs. The left steering motor 4L and the left steered angle sensor 10L are connected to a left steering ECU (left steering control device) 22 that is one of the lower-level ECUs. The right steering motor 4R and the right steered angle sensor 10R are connected to a right steering ECU (right steering control device) 23 that is one of the lower-level ECUs.

The higher-level ECU 20 calculates, in each predetermined calculation period, target reactive torque $T_F^*$ based on the steering torque Th detected by the torque sensor 9, the steering angle θh detected by the steering angle sensor 8, and the vehicle speed V detected by the vehicle speed sensor 11. The target reactive torque $T_F^*$ is a target value of reactive torque to be generated by the reactive-force motor 7. The target reactive torque $T_F^*$ calculated by the higher-level ECU 20 is sent to the reactive-force ECU 21 via, e.g., a communication line such as a controller area network (CAN).

The higher-level ECU 20 calculates, in each predetermined calculation period, a right target steered angle $\delta_R^*$ and a left target steered angle $\delta_L^*$ based on the steering angle θh detected by the steering angle sensor 8 and the vehicle speed V detected by the vehicle speed sensor 11. The right target steered angle $\delta_R^*$ is a target value of the steered angle of the tight steered wheel 3R, and the left target steered angle $\delta_L^*$ is a target value of the steered angle of the left steered wheel 3L. The higher-level ECU 20 calculates the right target steered angle $\delta_R^*$ and the left target steered angle $\delta_L^*$ so that, of the right target steered angle $\delta_R^*$ and the left target steered angle $\delta_L^*$, the absolute value of the target steered angle for the inner wheel of the vehicle making a turn becomes larger than the absolute value of the target steered angle for the outer wheel of the vehicle making a turn.

The left target steered angle $\delta_L^*$ calculated by the higher-level ECU 20 is sent to the left steering ECU 22 via, e.g., a communication line such as CAN. The right target steered angle $\delta_R^*$ calculated by the higher-level ECU 20 is sent to the right steering ECU 23 via, e.g., a communication line such as CAN. The right steering ECU 23 and the left steering ECU 22 can communicate with each other via, e.g., a communication line such as CAN.

Figure 2:
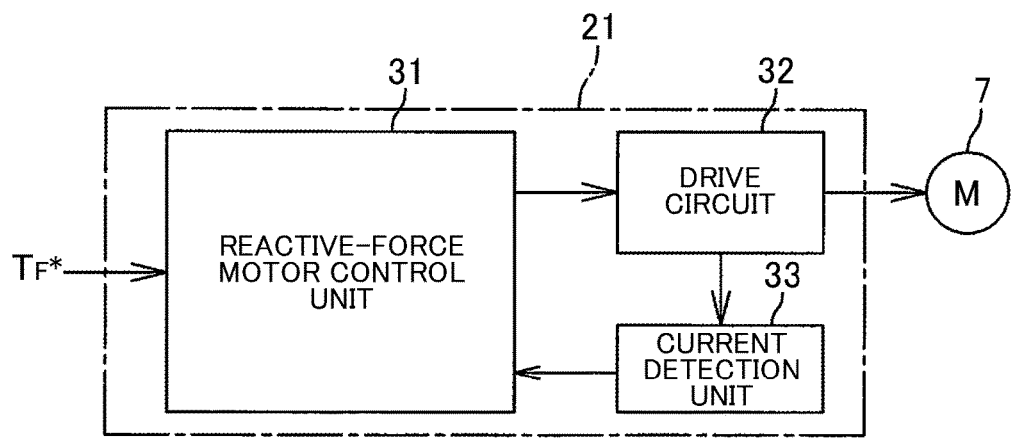
FIG. 2 is a block diagram showing the electrical configuration of a reactive-force electronic control unit (ECU)

FIG. 2 is a block diagram showing the electrical configuration of the reactive-force ECU 21. The reactive-force ECU 21 includes a reactive-force motor control unit 31, a drive circuit (inverter circuit) 32, and a current detection unit 33. The reactive-force motor control unit 31 is formed by a microcomputer. The drive circuit 32 is controlled by the reactive-force motor control unit 31 to supply electric power to the reactive-force motor 7. The current detection unit 33 detects a motor current flowing in the reactive-force motor 7.

The reactive-force motor control unit 31 receives the target reactive torque $T_F^*$ from the higher-level ECU 20. The reactive-force motor control unit 31 drivingly controls the drive circuit 32 for the reactive-force motor 7 based on the received target reactive torque $T_F^*$. Specifically, the reactive-force motor control unit 31 drivingly controls the drive circuit 32 so that the reactive-force motor 7 generates reactive torque according to the target reactive torque $T_F^*$.

Figure 3:
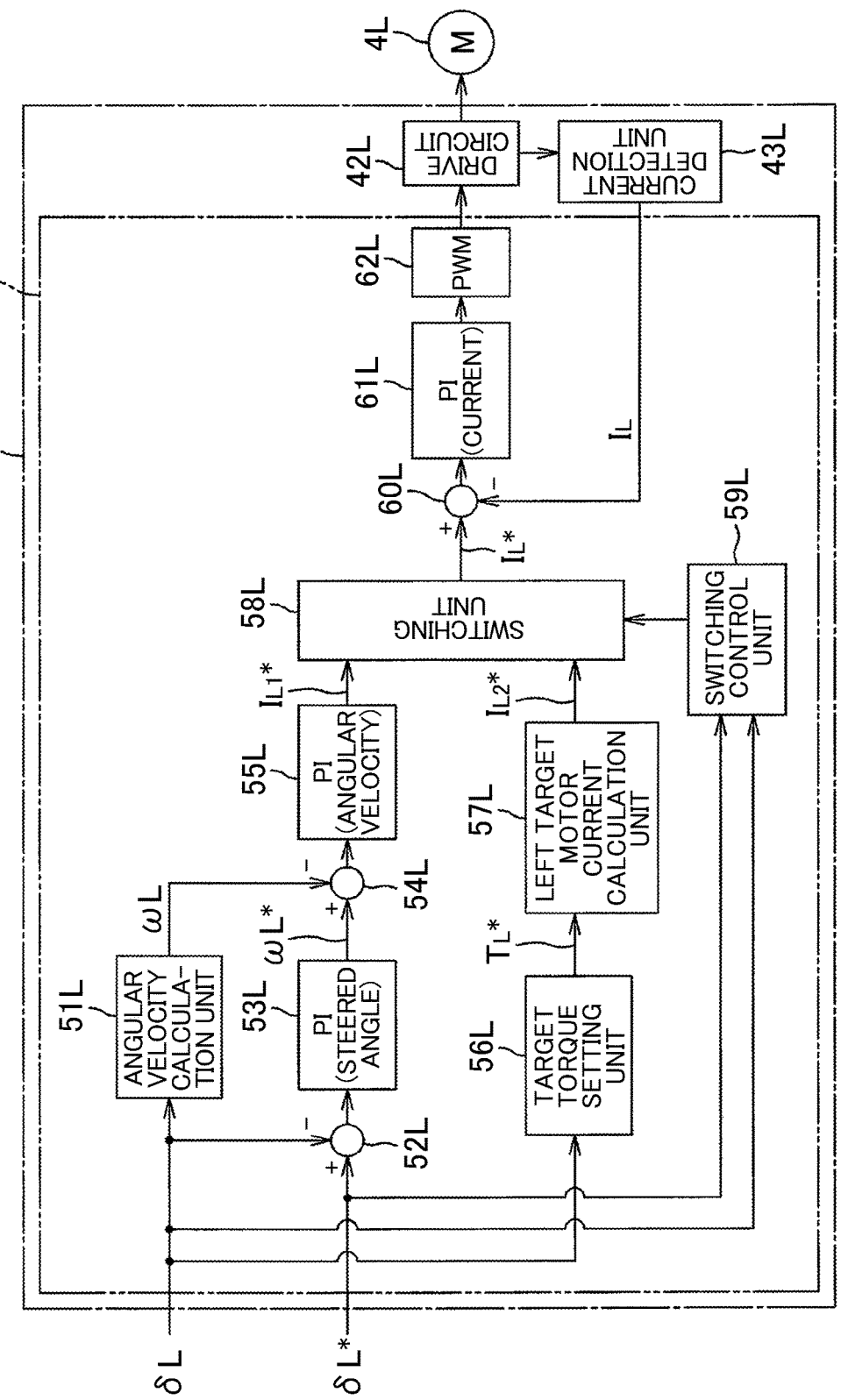
FIG. 3 is a block diagram showing the electrical configuration of a left steering ECU.

FIG. 3 is a block diagram showing the electrical configuration of the left steering ECU 22. The left steering ECU 22 includes a left steering motor control unit 41L, a drive circuit (inverter circuit) 42L, and a current detection unit 43L. The left steering motor control unit 41L is formed by a microcomputer. The drive circuit 42L is controlled by the left steering motor control unit 41L to supply electric power to the left steering motor 4L. The current detection unit 43L detects a motor current flowing in the left steering motor 4L.

The left steering motor control unit 41L includes a central processing unit (CPU) and a memory (ROM, RAM, nonvolatile memory, etc.). The left steering motor control unit 41L executes a predetermined program to function as a plurality of functional processing units. The plurality of functional processing units include an angular velocity calculation unit 51L, a steered angle deviation calculation unit 52L, a proportional-integral (PI) control unit (steered angle) 53L, an angular velocity deviation calculation unit 54L, a PI control unit (angular velocity) 55L, a target torque setting unit 56L, a left target motor current calculation unit 57L, a switching unit 58L, a switching control unit 59L, a current deviation calculation unit 60L, a PI control unit (current) 61L, and a pulse width modulation (PWM) control unit 62L.

Control modes of the left steering motor control unit 41L include a first control mode and a second control mode. The left steering motor control unit 41L normally operates in the first control mode. The left steering motor control unit 41L operates in the second control mode when abnormal communication occurs between the higher-level ECU 20 and the left steering ECU 22. The first control mode is a mode in which the left steering motor control unit 41L controls the left steering motor 4L so that the steered angle $\delta_L$ of the left steered wheel 3L becomes equal to the left target steered angle $\delta_L^*$ received from the higher-level ECU 20. The second control mode is a mode in which the left steering motor control unit 41L controls the left steering motor 4L by torque feedback control so that the steered angle $\delta_L$ of the left steered wheel 3L becomes equal to the angle (zero) corresponding to the neutral position of the left steered wheel 3L.

The angular velocity calculation unit 51L, the steered angle deviation calculation unit 52L, the PI control unit (steered angle) 53L, the angular velocity deviation calculation unit 54L, and the PI control unit (angular velocity) 55L calculate a left target motor current $I_{L1}^*$ (hereafter also referred to as the "first left target motor current $I_{L1}^*$") that is used in the first control mode. The target torque setting unit 56L and the left target motor current calculation unit 57L calculate a left target motor current $I_{L2}^*$ (hereinafter also referred to as the "second left target motor current $I_{L2}^*$") that is used in the second control mode. The switching unit 58L selects one of the first left target motor current $I_{L1}^*$ and the second left target motor current $I_{L2}^*$ and outputs the selected left target motor current as a target motor current $I_L^*$. The switching control unit 59L, which controls switching between the control modes, controls the switching unit 58L. The current deviation calculation unit 60L, the PI control unit 61L, and the PWM control unit 62L perform control so that the left motor current $I_L$ detected by the current detection unit 43L becomes equal to the left target motor current $I_L^*$ output from the switching unit 58L. Each unit will be described below.

The angular velocity calculation unit 51L differentiates the left steered angle $\delta_L$ detected by the left steered angle sensor 10L with respect to time. The angular velocity calculation unit 51L thus calculates the angular velocity (left steered angular velocity) $\omega_L$ of the left steered angle $\delta_L$. The steered angle deviation calculation unit 52L calculates the deviation $\Delta\delta_L$ ($=\delta_L^*-\delta_L$) between the left target steered angle $\delta_L^*$ received from the higher-level ECU 20 and the left steered angle $\delta_L$ detected by the left steered angle sensor 10L.

The PI control unit 53L performs PI calculation for the left steered angle deviation $\Delta\delta_L$ calculated by the steered angle deviation calculation unit 52L. The PI control unit 53L thus calculates the left target steered angular velocity $\omega_L^*$ that is a target value of the left steered angular velocity. The angular velocity deviation calculation unit 54L calculates the deviation $\Delta\omega_L$ ($=\omega_L^*-\omega_L$) between the left target steered angular velocity $\omega_L^*$ calculated by the PI control unit 53L and the left steered angular velocity $\omega_L$ calculated by the angular velocity calculation unit 51L.

Figure 4A:
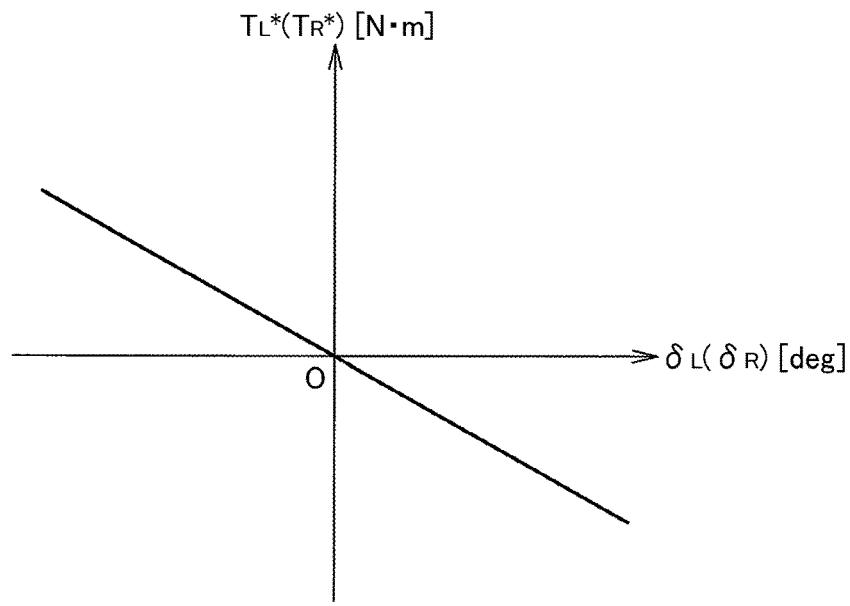
FIG. 4A is a graph showing an example of how target torque $T_L^*$ is set with respect to the steered angle $\delta_L$ of a left steered wheel.

The PI control unit 55L performs PI calculation for the left steered angular velocity deviation $\Delta\omega_L$ calculated by the angular velocity deviation calculation unit 54L. The PI control unit 55L thus calculates the first left target motor current $I_{L1}^*$ that is a target value of a current to be applied to the left steering motor 4L. The first left target motor current $I_{L1}^*$ calculated by the PI control unit 55L is input to a first input terminal of the switching unit 58L. Based on the left steered angle $\delta_L$ detected by the left steered angle sensor 10L, the target torque setting unit 56L sets target torque (target motor torque) $T_L^*$ that makes the steered angle $\delta_L$ of the left steered wheel 3L equal to zero. FIG. 4A shows an example of how the target torque setting unit 56L sets the target torque $T_L^*$ with respect to the steered angle $\delta_L$ of the steered wheel 3L. The output value of the left steered angle sensor 10L is positive when the detected left steered angle $\delta_L$ is a steered angle to the right with respect to the neutral position, and is negative when the detected left steered angle $\delta_L$ is a steered angle to the left with respect to the neutral position. The target torque $T_L^*$ is positive when the left steering motor 4L should generate motor torque for steering to the right, and is negative when the left steering motor 4L should generate motor torque for steering to the left.

Figure 4B:
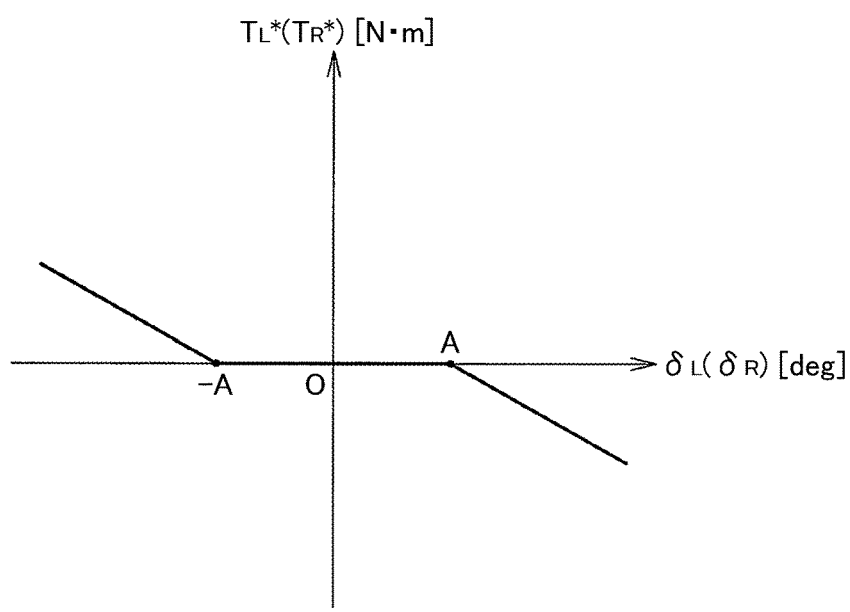
FIG. 4B is a graph showing another example of how the target torque $T_L^*$ is set with respect to the steered angle $\delta_L$ of the left steered wheel.

The target torque $T_L^*$ is set to zero when the left steered angle $\delta_L$ is zero (neutral position). The target torque $T_L^*$ is negative when the left steered angle $\delta_L$ is positive, and is positive when the left steered angle $\delta_L$ is negative. The target torque $T_L^*$ is set so that the absolute value of the target torque $T_L^*$ increases as the absolute value of the left steered angle $\delta_L$ increases. The target torque setting unit 56L may set the target torque $T_L^*$ in a manner shown in the example of FIG. 4B. In the example of FIG. 4B, A (A>0) is a predetermined value. The target torque $T_L^*$ is set to zero when the left steered angle $\delta_L$ is a very small value in the range of −A to A (left steered angle dead zone). In the case where the left steered angle $\delta_L$ is out of the range of −A to A, the target torque $T_L^*$ is negative when the left steered angle $\delta_L$ is positive, and is positive when the left steered angle $\delta_L$ is negative. In the case where the left steered angle $\delta_L$ is out of the range of −A to A, the target torque $T_L^*$ is set so that the absolute value of the target torque $T_L^*$ increases as the absolute value of the left steered angle $\delta_L$ increases.

The target torque $T_L^*$ set by the target torque setting unit 56L is sent to the left target motor current calculation unit 57L. The left target motor current calculation unit 57L calculates the second left target motor current $I_{L2}^*$ by dividing the target torque $T_L^*$ received from the target torque setting unit 56L by a torque constant of the left steering motor 4L. The second left target motor current $I_{L2}^*$ calculated by the left target motor current calculation unit 57L is input to a second input terminal of the switching unit 58L.

The switching unit 58L selects one of the first left target motor current $I_{L1}^*$ input to its first input terminal and the second left target motor current $I_{L2}^*$ input to its second input terminal and outputs the selected left target motor current. The switching unit 58L is controlled by the switching control unit 59L. The switching control unit 59L normally sets the control mode to the first control mode. Specifically, the switching control unit 59L controls the switching unit 58L so that the switching unit 58L selects the first left target motor current $I_{L1}^*$ input to its first input terminal.

The switching control unit 59L switches the control mode to the second control mode if abnormal communication occurs between the left steering ECU 22 and the higher-level ECU 20. Specifically, the switching control unit 59L controls the switching unit 58L so that the switching unit 58L selects the second left target motor current $I_{L2}^*$ input to its second input terminal. If communication between the left steering ECU 22 and the higher-level ECU 20 is restored in the second control mode, the switching control unit 59L returns the control mode to the first control mode when the absolute value of the difference between the left target steered angle $\delta_L^*$ received from the higher-level ECU 20 and the left steered angle $\delta_L$ becomes smaller than a predetermined value B (B>0).

For example, the switching control unit 59L determines that abnormal communication has occurred between the left steering ECU 22 and the higher-level ECU 20, if the number of communication errors between the left steering ECU 22 and the higher-level ECU 20 per predetermined time becomes larger than a predetermined first threshold. For example, the switching control unit 59L determines that communication has been restored, if the above number of communication errors becomes smaller than a predetermined second threshold after the abnormal communication occurred. Operation of the switching control unit 59L will be described in detail later.

The current deviation calculation unit 60L calculates the deviation $\Delta I_L$ (=$I_L^*-I_L$) between the left target motor current $I_L^*$ output from the switching unit 58L and the left motor current $I_L$ detected by the current detection unit 43L. The PI control unit 61L performs PI calculation for the left motor current deviation $\Delta I_L$ calculated by the current deviation calculation unit 60L. The PI control unit 61L thus generates a left motor drive command value for controlling the left motor current $I_L$ flowing in the left steering motor 4L to the left target motor current $I_L^*$.

Figure 5:
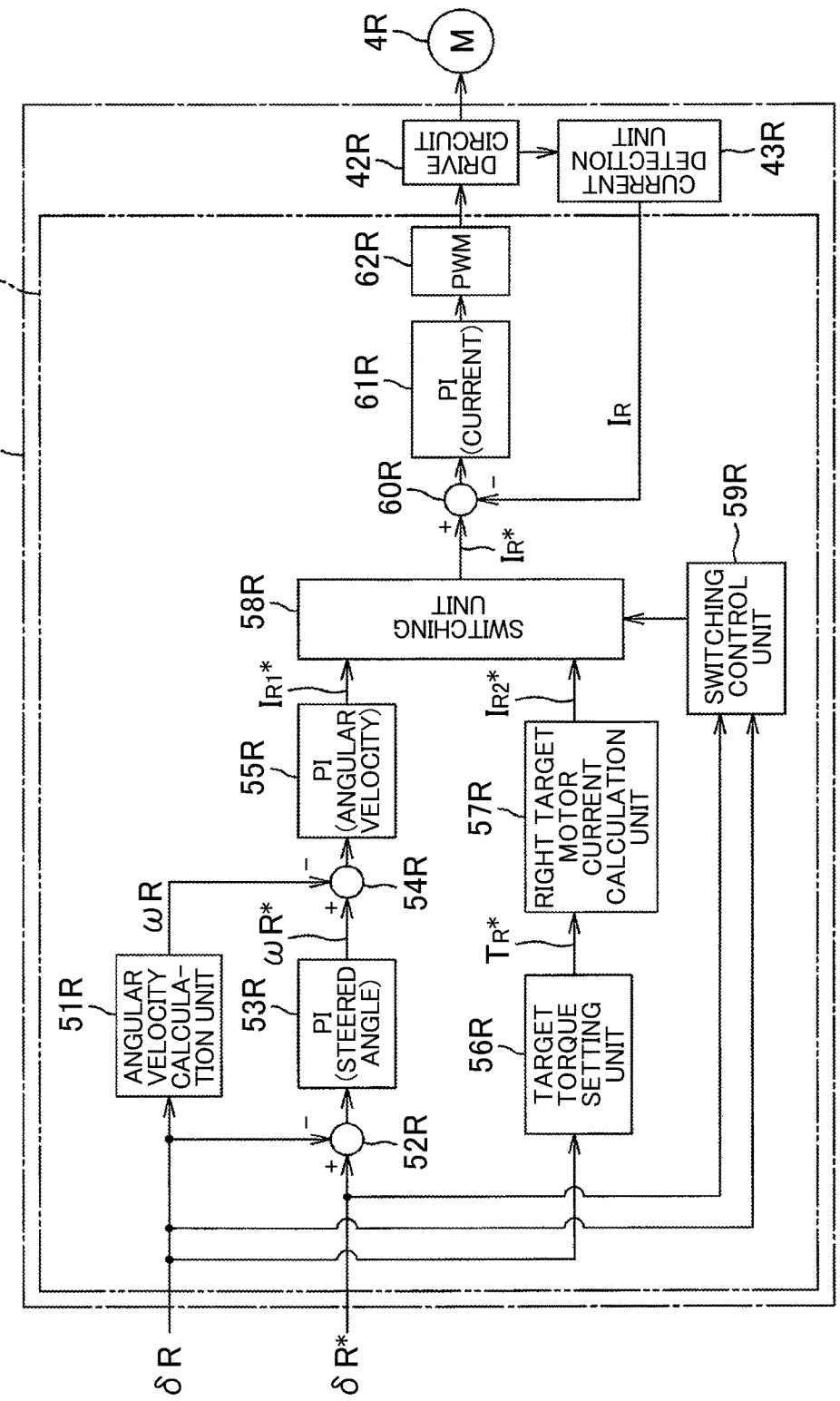
FIG. 5 is a block diagram showing the electrical configuration of a right steering ECU.

The PWM control unit 62L generates a left PWM control signal with a duty cycle corresponding to the left motor drive command value and supplies the left PWM control signal to the drive circuit 42L. Electric power corresponding to the left motor drive command value is thus supplied to the left steering motor 4L. FIG. 5 is a block diagram showing the electrical configuration of the right steering ECU 23. The right steering ECU 23 includes a right steering motor control unit 41R, a drive circuit (inverter circuit) 42R, and a current detection unit 43R. The right steering motor control unit 41R is formed by a microcomputer. The drive circuit 42R is controlled by the right steering motor control unit 41R to supply electric power to the right steering motor 4R. The current detection unit 43R detects a motor current flowing in the right steering motor 4R.

The right steering motor control unit 41R includes a CPU and a memory (ROM, RAM, nonvolatile memory, etc.). The right steering motor control unit 41R functions as a plurality of functional processing units by executing a predetermined program. The plurality of functional processing units include an angular velocity calculation unit 51R, a steered angle deviation calculation unit 52R, a PI control unit (steered angle) 53R, an angular velocity deviation calculation unit 54R, a PI control unit (angular velocity) 55R, a target torque setting unit 56R, a right target motor current calculation unit 57R, a switching unit 58R, a switching control unit 59R, a current deviation calculation unit 60R, a PI control unit (current) 61R, and a PWM control unit 62R.

Control modes of the right steering motor control unit 41R include a third control mode and a fourth control mode. The right steering motor control unit 41R normally operates in the third control mode. The right steering motor control unit 41R operates in the fourth control mode when abnormal communication occurs between the higher-level ECU 20 and the right steering ECU 23. The third control mode is a mode in which the right steering motor control unit 41R controls the right steering motor 4R so that the steered angle $\delta_R$ of the right steered wheel 3R becomes equal to the right target steered angle $\delta_R^*$ received from the higher-level ECU 20. The fourth control mode is a mode in which the right steering motor control unit 41R controls the right steering motor 4R by torque feedback control so that the steered angle $\delta_R$ of the right steered wheel 3R becomes equal to the angle (zero) corresponding to the neutral position of the right steered wheel 3R.

The angular velocity calculation unit 51R, the steered angle deviation calculation unit 52R, the PI control unit (steered angle) 53R, the angular velocity deviation calculation unit 54R, and the PI control unit (angular velocity) 55R calculate a right target motor current $I_{R1}^*$ (hereafter also referred to as the "first right target motor current $I_{R1}^*$") that is used in the third control mode. The target torque setting unit 56R and the right target motor current calculation unit 57R calculate a right target motor current $I_{R2}^*$ (hereinafter also referred to as the "second right target motor current $I_{R2}^*$") that is used in the fourth control mode. The switching unit 58R selects one of the first right target motor current $I_{R1}^*$ and the second right target motor current $I_{R2}^*$ and outputs the selected right target motor current as a target motor current $I_R^*$. The switching control unit 59R, which controls switching between the control modes, controls the switching unit 58R. The current deviation calculation unit 60R, the PI control unit 61R, and the PWM control unit 62R perform control so that the right motor current $I_R$ detected by the current detection unit 43R becomes equal to the right target motor current $I_R^*$ output from the switching unit 58R. Each unit will be described below.

The angular velocity calculation unit 51R differentiates the right steered angle $\delta_R$ detected by the right steered angle sensor 10R with respect to time. The angular velocity calculation unit 51R thus calculates the angular velocity (right steered angular velocity) $\omega_R$ of the right steered angle $\delta_R$. The steered angle deviation calculation unit 52R calculates the deviation $\Delta\delta_R$ ($=\delta_R^*-\delta_R$) between the right target steered angle $\delta_R^*$ received from the higher-level ECU 20 and the right steered angle $\delta_R$ detected by the right steered angle sensor 10R.

The PI control unit 53R performs PI calculation for the right steered angle deviation $\Delta\delta_R$ calculated by the steered angle deviation calculation unit 52R. The PI control unit 53R thus calculates the right target steered angular velocity $\omega_R^*$ that is a target value of the right steered angular velocity. The angular velocity deviation calculation unit 54R calculates the deviation $\Delta\omega_R$ ($=\omega_R^*-\omega_R$) between the right target steered angular velocity $\omega_R^*$ calculated by the PI control unit 53R and the right steered angular velocity $\omega_R$ calculated by the angular velocity calculation unit 51R.

The PI control unit 55R performs PI calculation for the right steered angular velocity deviation $\Delta\omega_R$ calculated by the angular velocity deviation calculation unit 54R. The PI control unit 55R thus calculates the first right target motor current $I_{R1}^*$ that is a target value of a current to be applied to the right steering motor 4R. The first right target motor current $I_{R1}^*$ calculated by the PI control unit 55R is input to a first input terminal of the switching unit 58R. Based on the right steered angle $\delta_R$ detected by the right steered angle sensor 10R, the target torque setting unit 56R sets target torque (target motor torque) $T_R^*$ that makes the steered angle $\delta_R$ of the right steered wheel 3R equal to zero. For example, the target torque setting unit 56R sets the target torque $T_R^*$ with respect to the steered angle $\delta_R$ of the steered wheel 3R in a manner similar to that shown in the example of FIG. 4A. Alternatively, the target torque setting unit 56R may set the target torque $T_R^*$ with respect to the steered angle $\delta_R$ of the steered wheel 3R in a manner similar to that shown in the example of FIG. 4B.

The target torque $T_R^*$ set by the target torque setting unit 56R is sent to the right target motor current calculation unit 57R. The right target motor current calculation unit 57R calculates the second right target motor current $I_{R2}^*$ by dividing the target torque $T_R^*$ received from the target torque setting unit 56R by a torque constant of the right steering motor 4R. The second right target motor current $I_{R2}^*$ calculated by the right target motor current calculation unit 57R is input to a second input terminal of the switching unit 58R.

The switching unit 58R selects one of the first right target motor current $I_{R1}^*$ input to its first input terminal and the second right target motor current $I_{R2}^*$ input to its second input terminal and outputs the selected right target motor current. The switching unit 58R is controlled by the switching control unit 59R. The switching control unit 59R normally sets the control mode to the third control mode. Specifically, the switching control unit 59R controls the switching unit 58R so that the switching unit 58R selects the first right target motor current $I_{R1}^*$ input to its first input terminal.

The switching control unit 59R switches the control mode to the fourth control mode if abnormal communication occurs between the right steering ECU 23 and the higher-level ECU 20. Specifically, the switching control unit 59R controls the switching unit 58R so that the switching unit 58R selects the second right target motor current $I_{R2}^*$ input to its second input terminal. If communication between the right steering ECU 23 and the higher-level ECU 20 is restored in the fourth control mode, the switching control unit 59R returns the control mode to the third control mode when the absolute value of the difference between the right target steered angle $\delta_R^*$ received from the higher-level ECU 20 and the right steered angle $\delta_R$ becomes smaller than the predetermined value B (B>0).

For example, the switching control unit 59R determines that abnormal communication has occurred between the right steering ECU 23 and the higher-level ECU 20, if the number of communication errors between the right steering ECU 23 and the higher-level ECU 20 per predetermined time becomes larger than a predetermined first threshold. For example, the switching control unit 59R determines that communication has been restored, if the above number of communication errors becomes smaller than a predetermined second threshold after the abnormal communication occurred. Operation of the switching control unit 59R will be described in detail later.

The current deviation calculation unit 60R calculates the deviation $\Delta I_R$ ($=I_R^*-I_R$) between the right target motor current $I_R^*$ output from the switching unit 58R and the right motor current $I_R$ detected by the current detection unit 43R. The PI control unit 61R performs PI calculation for the right motor current deviation $\Delta I_R$ calculated by the current deviation calculation unit 60R. The PI control unit 61R thus generates a right motor drive command value for controlling the right motor current $I_R$ flowing in the right steering motor 4R to the right target motor current $I_R^*$.

Figure 6:
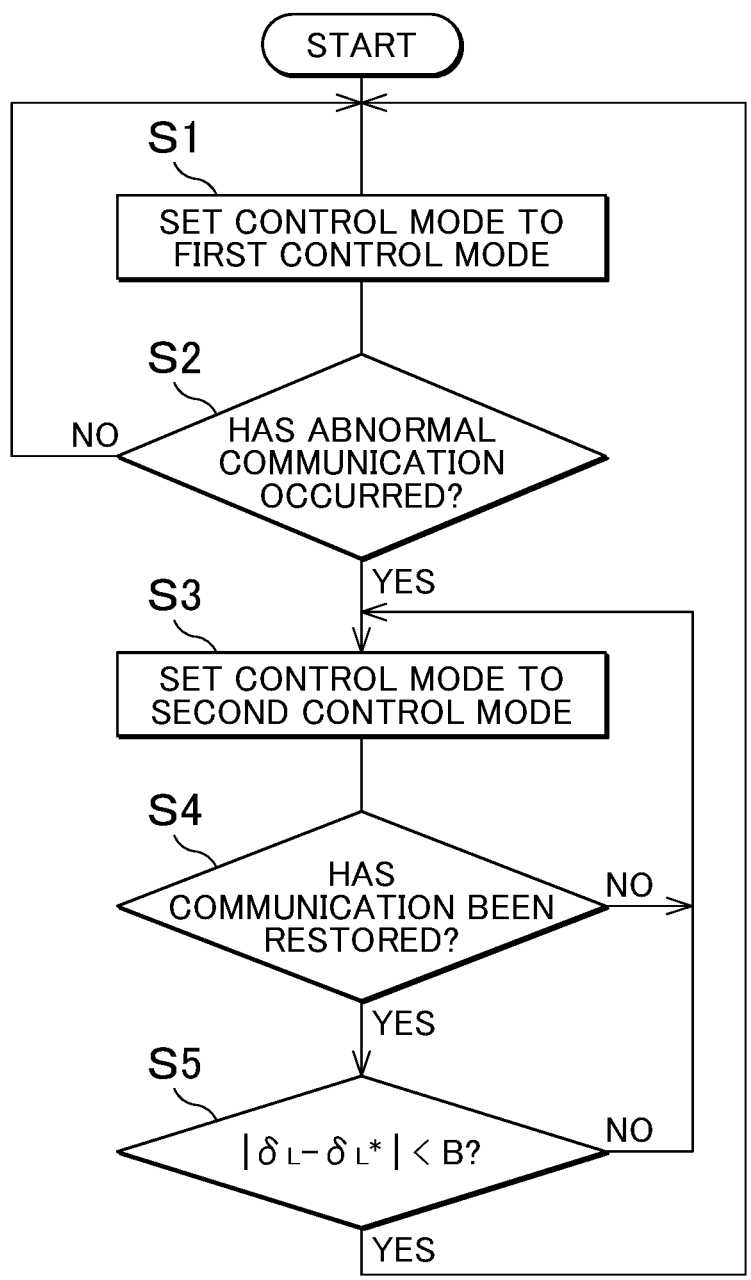
FIG. 6 is a flowchart illustrating operation of a switching control unit in a left steering motor control unit.

The PWM control unit 62R generates a right PWM control signal with a duty cycle corresponding to the right motor drive command value and supplies the right PWM control signal to the drive circuit 42R. Electric power corresponding to the right motor drive command value is thus supplied to the right steering motor 4R. FIG. 6 is a flowchart illustrating operation of the switching control unit 59L in the left steering motor control unit 41L.

When the left steering ECU 22 is powered on, the switching control unit 59L sets the control mode to the first control mode (step S1). Specifically, the switching control unit 59L controls the switching unit 58L so that the switching unit 58L selects the first left target motor current $I_{L1}^*$ input to its first input terminal. The switching control unit 59L determines if abnormal communication has occurred between the left steering ECU 22 and the higher-level ECU 20 (step S2).

If abnormal communication has not occurred (step S2: NO), the routine returns to step S1. If it is determined in step S2 that abnormal communication has occurred (step S2: YES), the switching control unit 59L sets the control mode to the second control mode (step S3). Specifically, the switching control unit 59L controls the switching unit 58L so that the switching unit 58L selects the second left target motor current $I_{L2}^*$ input to its second input terminal. The switching control unit 59L then determines if communication between the left steering ECU 22 and the higher-level ECU 20 has been restored (step S4).

If communication has not been restored (step S4: NO), the routine returns to step S3. If it is determined in step S4 that communication has been restored (step S4: YES), the switching control unit 59L determines if the absolute value $|\delta_L-\delta_L^*|$ of the difference between the left target steered angle $\delta_L^*$ received from the higher-level ECU 20 and the left steered angle $\delta_L$ is smaller than the predetermined value B (step S5). If the absolute value $|\delta_L-\delta_L^*|$ is equal to or larger than the predetermined value B (step S5: NO), the routine returns to step S3.

Figure 7:
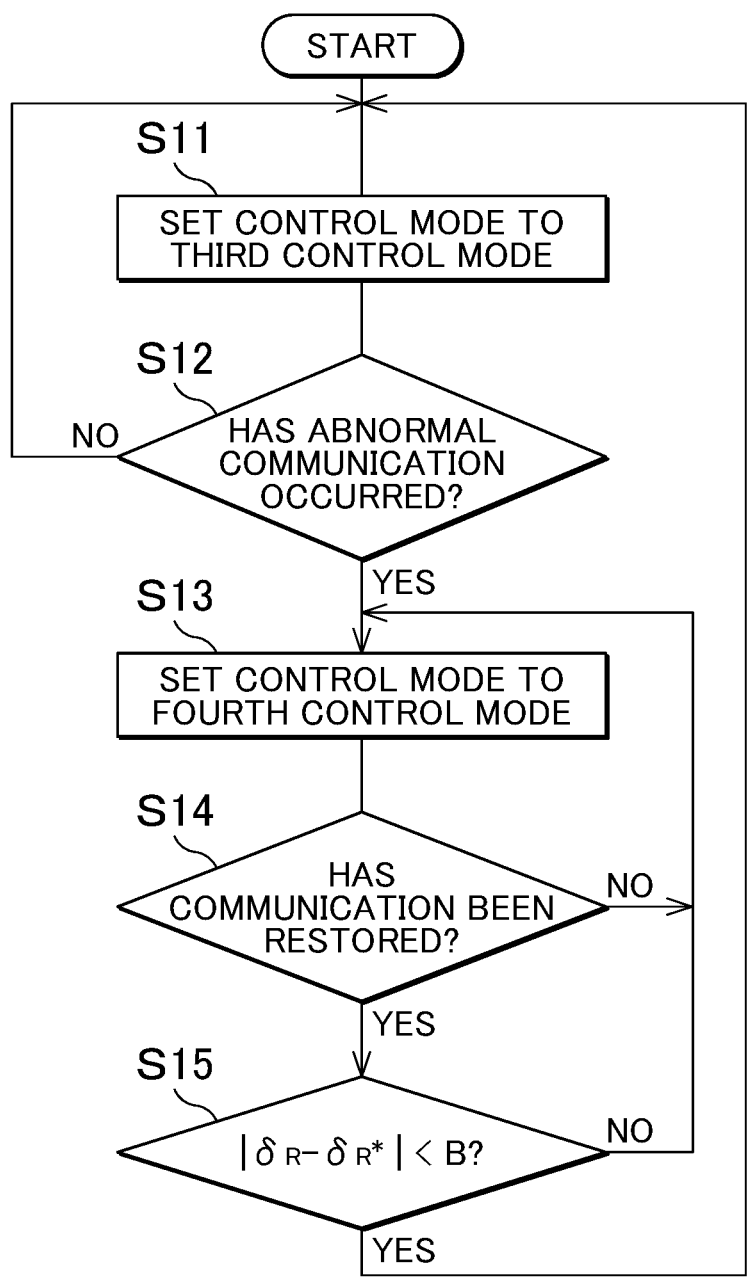
FIG. 7 is a flowchart illustrating operation of a switching control unit in a right steering motor control unit.

If it is determined in step S5 that the absolute value $|\delta_L-\delta_L^*|$ is smaller than the predetermined value B (step S5: YES), the routine returns to step S1. FIG. 7 is a flowchart illustrating operation of the switching control unit 59R in the right steering motor control unit 41R. When the right steering ECU 23 is powered on, the switching control unit 59R sets the control mode to the third control mode (step S11). Specifically, the switching control unit 59R controls the switching unit 58R so that the switching unit 58R selects the first right target motor current $I_{R1}^*$ input to its first input terminal. The switching control unit 59R determines if abnormal communication has occurred between the right steering ECU 23 and the higher-level ECU 20 (step S12).

If abnormal communication has not occurred (step S12: NO), the routine returns to step S11. If it is determined in step S12 that abnormal communication has occurred (step S12: YES), the switching control unit 59R sets the control mode to the fourth control mode (step S13). Specifically, the switching control unit 59R controls the switching unit 58R so that the switching unit 58R selects the second right target motor current $I_{R2}^*$ input to its second input terminal. The switching control unit 59R then determines if communication between the right steering ECU 23 and the higher-level ECU 20 has been restored (step S14).

If communication has not been restored (step S14: NO), the routine returns to step S13. If it is determined in step S14 that communication has been restored (step S14: YES), the switching control unit 59R determines if the absolute value $|\delta_R-\delta_R^*|$ of the difference between the right target steered angle $\delta_R^*$ received from the higher-level ECU 20 and the right steered angle $\delta_R$ is smaller than the predetermined value B (step S15). If the absolute value $|\delta_R-\delta_R^*|$ is equal to or larger than the predetermined value B (step S15: NO), the routine returns to step S13.

If it is determined in step S15 that the absolute value $|\delta_R-\delta_R^*|$ is smaller than the predetermined value B (step S15: YES), the routine returns to step S11. If abnormal communication has not occurred between the higher-level ECU 20 and the left steering ECU 22 and between the higher-level ECU 20 and the right steering ECU 23, the left steering motor 4L is controlled in the first control mode and the right steering motor 4R is controlled in the third control mode. That is, the left steering motor 4L and the right steering motor 4R are controlled so that the left steered angle $\delta_L$ and the right steered angle $\delta_R$ become equal to the left target steered angle $\delta_L^*$ and the right target steered angle $\delta_R^*$ which are sent from the higher-level ECU 20, respectively.

For example, if abnormal communication occurs between the higher-level ECU 20 and the left steering ECU 22 while the left steering motor 4L is being controlled in the first control mode and the right steering motor 4R is being controlled in the third control mode, the left steering motor 4L will be controlled in the second control mode. Accordingly, the left steering motor 4L is controlled by torque feedback control so that the left steered angle $\delta_L$ becomes equal to zero. The right steering motor 4R is controlled so that the right steered angle $\delta_R$ becomes equal to the right target steered angle $\delta_R^*$.

The left steered wheel 3L is thus controlled by torque feedback control so that the left steered angle $\delta_L$ becomes equal to zero. Accordingly, the left steered angle $\delta_L$ tends to change due to an external force even when the vehicle is turning, and the left steered angle $\delta_L$ tends to return to zero if the external force is not applied anymore. The left steered wheel 3L therefore less affects turning of the vehicle with the right steered wheel 3R. The vehicle can thus travel while maintaining its steering performance.

If communication between the higher-level ECU 20 and the left steering ECU 22 is restored thereafter, the left steering motor 4L is controlled in the first control mode when the absolute value $|\delta_L-\delta_L^*|$ of the difference between the left target steered angle $\delta_L^*$ received from the higher-level ECU 20 and the left steered angle $\delta_L$ becomes smaller than the predetermined value B. For example, if abnormal communication occurs between the higher-level ECU 20 and the right steering ECU 23 while the left steering motor 4L is being controlled in the first control mode and the right steering motor 4R is being controlled in the third control mode, the right steering motor 4R will be controlled in the fourth control mode. Accordingly, the right steering motor 4R is controlled by torque feedback control so that the right steered angle $\delta_R$ becomes equal to zero. The left steering motor 4L is controlled so that the left steered angle $\delta_L$ becomes equal to the left target steered angle $\delta_L^*$.

The right steered wheel 3R is thus controlled by torque feedback control so that the right steered angle $\delta_R$ becomes equal to zero. Accordingly, the right steered angle $\delta_R$ tends to change due to an external force even when the vehicle is turning, and the right steered angle $\delta_R$ tends to return to zero if the external force is not applied anymore. The right steered wheel 3R therefore less affects turning of the vehicle with the left steered wheel 3L. The vehicle can thus travel while maintaining its steering performance.

If communication between the higher-level ECU 20 and the right steering ECU 23 is restored thereafter, the right steering motor 4R is controlled in the third control mode when the absolute value $|\delta_R-\delta_R^*|$ of the difference between the right target steered angle $\delta_R^*$ received from the higher-level ECU 20 and the right steered angle $\delta_R$ becomes smaller than the predetermined value B. Although one embodiment of the present invention is described above, the present invention may be carried out in other forms. For example, in the above embodiment, if abnormal communication occurs between the higher-level ECU 20 and the left steering ECU 22 while the left steering motor 4L is being controlled in the first control mode and the right steering motor 4R is being controlled in the third control mode, the control mode of the left steering motor control unit 41L is switched to the second control mode. In this case, the right steering motor control unit 41R may also perform control so as to increase an apparent overall gear ratio (ratio of the steered angle to the steering wheel angle).

For example, the right steering motor control unit 41R may multiply the right target steered angle $\delta_R^*$ sent from the higher-level ECU 20 by gain larger than 1 and output the right target steered angle $\delta_R^*$ multiplied by the gain to the steered angle deviation calculation unit 52R as a right target steered angle $\delta_R^*$. For example, the right steering motor control unit 41R may multiply the first right target motor current $I_{R1}^*$ calculated by the PI control unit 55R by gain larger than 1 and output the first right target motor current $I_{R1}^*$ multiplied by the gain to the first input terminal of the switching unit 58R. This allows the right steered wheel 3R to generate a larger cornering force. Accordingly, degradation in turning performance of the vehicle can be restrained even if the absolute value of the steered angle $\delta_L$ of the left steered wheel 3L becomes smaller than the absolute value of the right steered angle $\delta_R$ by torque feedback control.

Similarly, for example, in the above embodiment, if abnormal communication occurs between the higher-level ECU 20 and the right steering ECU 23 while the left steering motor 4L is being controlled in the first control mode and the left steering motor 4L is being controlled in the third control mode, the control mode of the right steering motor control unit 41R is switched to the fourth control mode. In this case, the left steering motor control unit 41L may also perform control so as to increase an apparent overall gear ratio (ratio of the steered angle to the steering wheel angle).

For example, the left steering motor control unit 41L may multiply the left target steered angle $\delta_L^*$ sent from the higher-level ECU 20 by gain larger than 1 and output the left target steered angle $\delta_L^*$ multiplied by the gain to the steered angle deviation calculation unit 52L as a left target steered angle $\delta_L^*$. For example, the left steering motor control unit 41L may multiply the first left target motor current $I_{L1}^*$ calculated by the PI control unit 55L by gain larger than 1 and output the first left target motor current $I_{L1}^*$ multiplied by the gain to the first input terminal of the switching unit 58L. This allows the left steered wheel 3L to generate a larger cornering force. Accordingly, degradation in turning performance of the vehicle can be restrained even if the absolute value of the steered angle $\delta_R$ of the right steered wheel 3R becomes smaller than the absolute value of the left steered angle $\delta_L$ by torque feedback control.

Further, various design changes may be made within the technical scope defined in the appended claims.

What is claimed is:

1. A vehicle steering device, which includes a right steering operation mechanism that steers a right steered wheel and a left steering operation mechanism that steers a left steered wheel, and in which a steering member that is operated to steer a vehicle is mechanically coupled to neither the right steering operation mechanism nor the left steering operation mechanism, the right steering operation mechanism being driven by a right steering motor, and the left steering operation mechanism being driven by a left steering motor, the vehicle steering device comprising:
    a higher-level control device that sets a right target steered angle and a left target steered angle, the right target steered angle being a target value for a steered angle of the right steered wheel, and the left target steered angle being a target value for a steered angle of the left steered wheel;
    a left steering control device that drivingly controls the left steering motor; and
    a right steering control device that drivingly controls the right steering motor, wherein:
    the left steering control device
        switches a left control mode between a first control mode and a second control mode, the first control mode being a mode in which the left steering control device controls the left steering motor so that the steered angle of the left steered wheel becomes equal to the left target steered angle received from the higher-level control device, and the second control mode being a mode in which the left steering control device controls the left steering motor by torque feedback control so that the steered angle of the left steered wheel becomes equal to an angle corresponding to a neutral position of the left steered wheel independent of a steering wheel, and
        normally sets the left control mode to the first control mode, and switches the left control mode to the second control mode when abnormal communication occurs between the higher-level control device and the left steering control device;
    the right steering control device
        switches a right control mode between a third control mode and a fourth control mode, the third control mode being a mode in which the right steering control device controls the right steering motor so that the steered angle of the right steered wheel becomes equal to the right target steered angle received from the higher-level control device, and the fourth control mode being a mode in which the right steering control device controls the right steering motor by torque feedback control so that the steered angle of the right steered wheel becomes equal to an angle corresponding to a neutral position of the right steered wheel independent of the steering wheel, and
        normally sets the right control mode to the third control mode, and switches the right control mode to the fourth control mode when abnormal communication occurs between the higher-level control device and the right steering control device.

2. The vehicle steering device according to claim 1, further comprising:
    a left steered angle sensor that detects a left steered angle that is the steered angle of the left steered wheel; and
    a right steered angle sensor that detects a right steered angle that is the steered angle of the right steered wheel, wherein
    the left steering control device is further configured to:
        if communication between the higher-level control device and the left steering control device is restored in the second control mode, switch the left control mode to the first control mode when an absolute value of a difference between the left target steered angle received from the higher-level control device and the left steered angle detected by the left steered angle sensor becomes smaller than a first predetermined value; and
    the right steering control device is further configured to:
        if communication between the higher-level control device and the right steering control device is restored in the fourth control mode, switch the right control mode to the third control mode when an absolute value of a difference between the right target steered angle received from the higher-level control device and the right steered angle detected by the right steered angle sensor becomes smaller than a second predetermined value.

3. The vehicle steering device according to claim 1, wherein:
    the left steering control device increases an apparent overall gear ratio for the left steered wheel when the left control mode of the left steering control device is the first control mode and the right control mode of the right steering control device is the fourth control mode; and
    the right steering control device increases an apparent overall gear ratio for the right steered wheel when the right control mode of the right steering control device is the third control mode and the left control mode of the left steering control device is the second control mode.

4. The vehicle steering device according to claim 2, wherein:

the left steering control device increases an apparent overall gear ratio for the left steered wheel when the left control mode of the left steering control device is the first control mode and the right control mode of the right steering control device is the fourth control mode; and the right steering control device increases an apparent overall gear ratio for the right steered wheel when the right control mode of the right steering control device is the third control mode and the left control mode of the left steering control device is the second control mode.

\* \* \* \* \*